2 Sheets—Sheet 1.

J. DAVIES & F. B. CHIDESTER.
Lathe.

No. 225,921. Patented Mar. 30, 1880.

Witnesses:
Henry Eichling
George Holmes
George Boutcher

Inventor:
James Davies
Foster B. Chidester

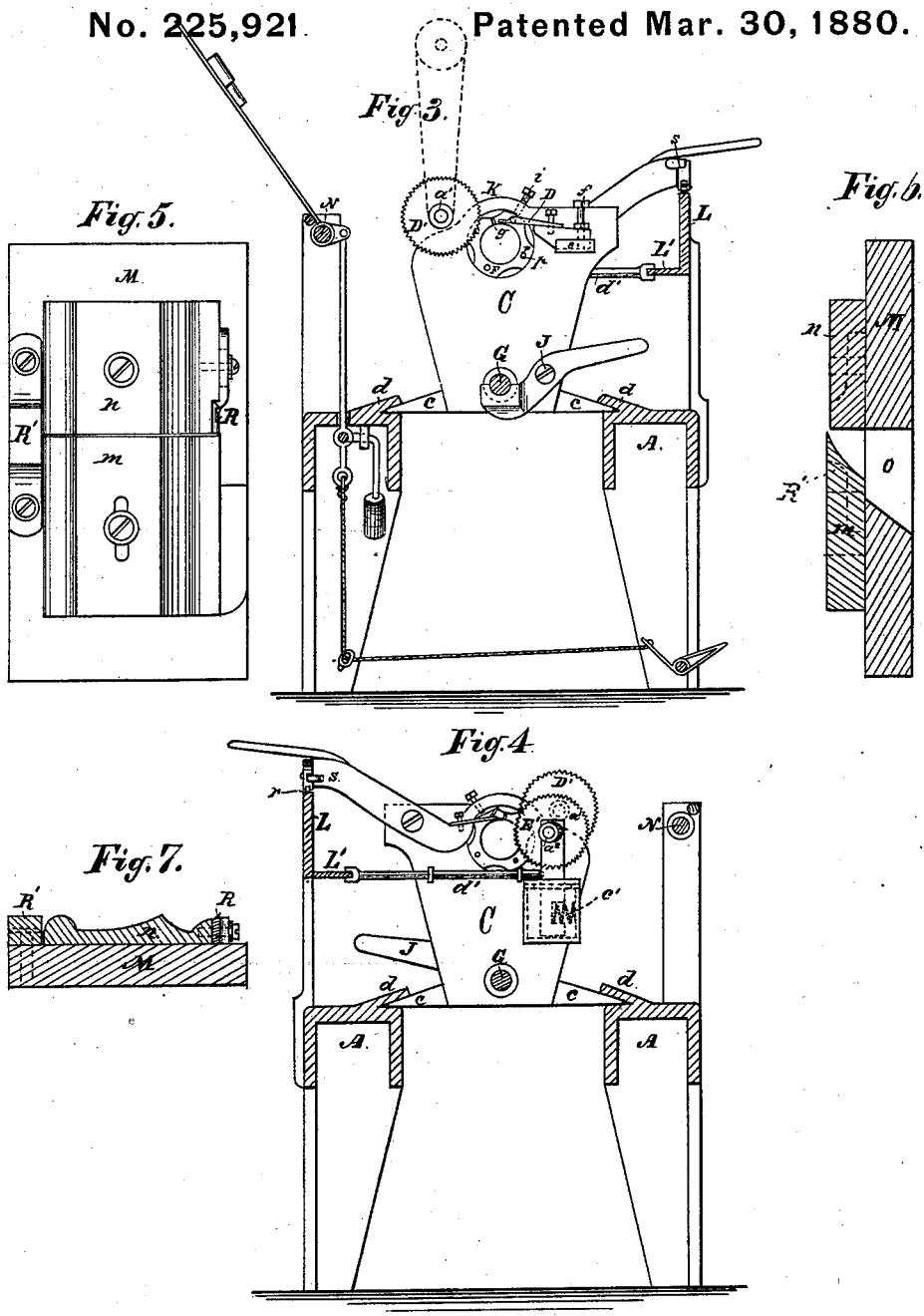

UNITED STATES PATENT OFFICE.

JAMES DAVIES AND FOSTER B. CHIDESTER, OF JERSEY CITY, NEW JERSEY, ASSIGNORS OF ONE-THIRD OF THEIR RIGHT TO LEWIS H. BROOME, OF SAME PLACE.

LATHE.

SPECIFICATION forming part of Letters Patent No. 225,921, dated March 30, 1880.

Application filed December 6, 1879.

*To all whom it may concern:*

Be it known that we, JAMES DAVIES and FOSTER B. CHIDESTER, both of Jersey City, in the county of Hudson and State of New Jersey, have invented a new and useful Improvement in Lathes and kindred structures, of which the following is a specification.

This invention relates to improvements in lathes or kindred structures in which the blank or piece to be operated on is caused to revolve, and while in revolution is cut down to the required size and shape; and it consists in a revolving saw arranged to move along the line of the blank and to cut away its surface, in combination with a device attached to the head or carrier to clamp the blank near the saw while it operates upon it; a revolving saw and a device to clamp the blank, in combination with a guide or pattern bar and mechanism, substantially as described, by which such saw is adjusted laterally as it moves along the line of the blank; and the combination of a revolving saw and a cutter, both arranged to move simultaneously along the line of the blank to operate upon it, all substantially as hereinafter more particularly described and shown.

The invention is illustrated in the accompanying drawings, (two sheets,) in which—

Figure 1:
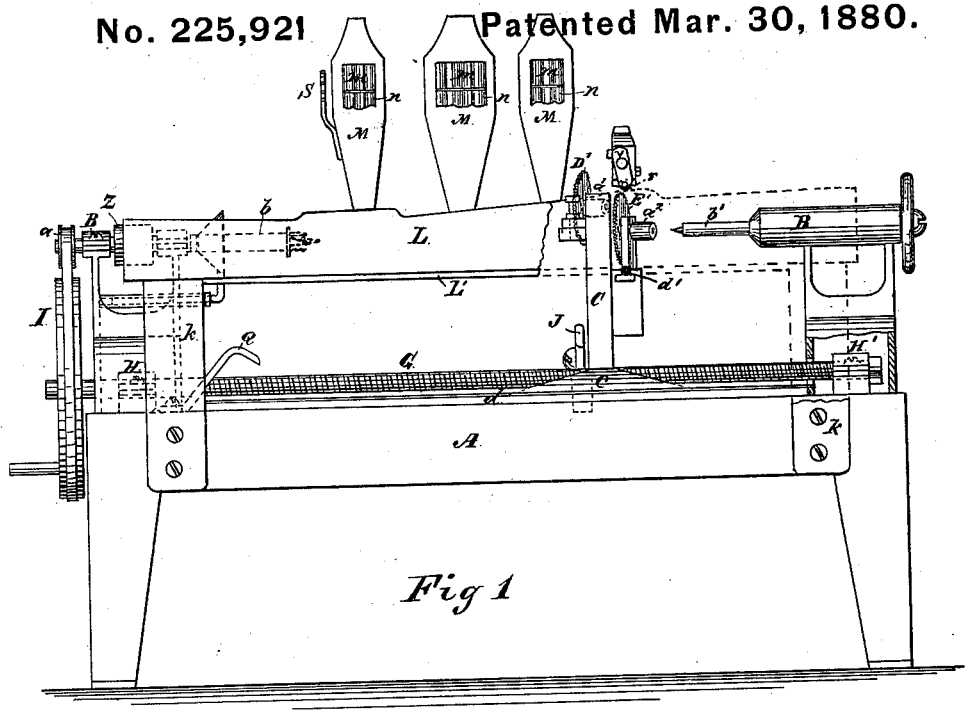
Figure 2:
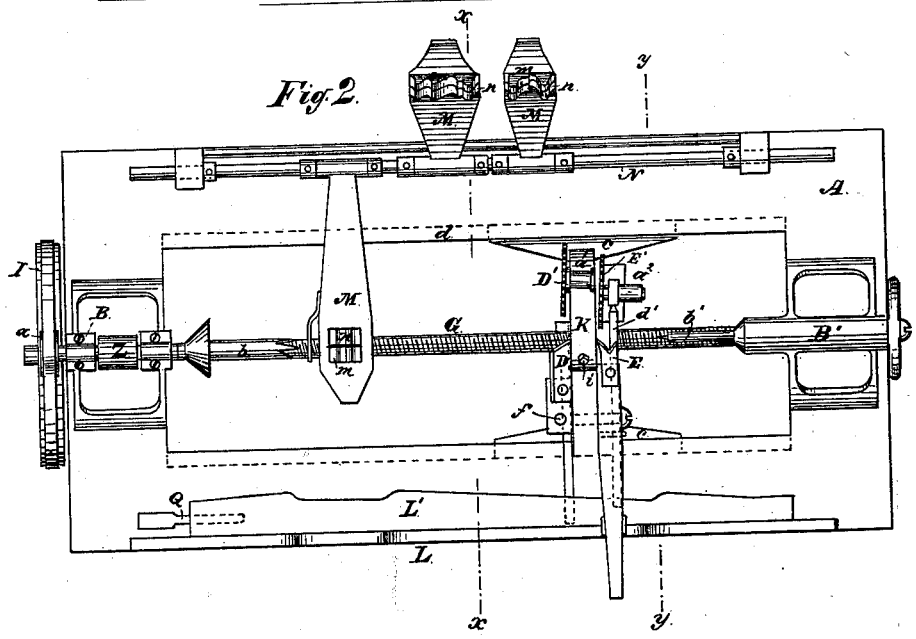

Figure 1 is a front elevation of the lathe. Fig. 2 is a plan view of the same. Fig. 3 is a cross-section on the line $x\ x$ of Fig. 2, to show the head or carrier with revolving saw and cutter next the head-stock. Fig. 4 is a cross-section on the line $y\ y$ of Fig. 2, to show the head or carrier with revolving saw and cutter, and with means of adjustment next the tail-stock; and Figs. 5, 6, and 7 are detailed views of molding-cutters, gages, and cutting-spur R, and gage or stop R'.

As the present invention is especially adapted to that class of lathes for which we received Letters Patent No. 218,863, dated August 26, 1879, we have shown substantially that construction in the accompanying drawings, and reference is made to the specification of the said patent for a full description of the construction and operation of those parts which are only briefly described herein, but which, for convenience of reference, are designated by the same letters.

A brief description of the lathe to which the present improvements are applied is as follows:

A represents the bed of the lathe; B B', the head and tail stocks; $b\ b'$, the spindles; C, a head or carrier arranged to move between the spindles and carrying a trimming-cutter, D, and a shaping-cutter, E. To the under part of this head or carrier are attached projecting wings or supports $c\ c$, which slide in the ways $d\ d$ as the head is moved to and fro between the spindles.

G is a revolving feed-screw, and J a lever attached to the head C, and having one of its ends provided with a threaded half-nut to engage with the feed-screw, by which means the head is caused, by the revolution of the feed-screw, to advance toward the head-stock.

F is a ring constructed to expand automatically to permit it to pass over the trimmed blank, and at the same time to clamp the blank to prevent it from springing while the cutters operate upon it.

L is a guide or pattern bar, over which the pivoted arm of the cutter E rides, and whereby its cutting-edge is adjusted.

M is a holder or stock, to which are attached the molding-cutters and their gages. $m$ is a molding-cutter of the reverse shape of the required molding, and $n$ is a gage of the same shape as the cutter $m$. These cutters and gages are arranged upon their holders or stocks, as shown in Figs. 5 and 6, and the holders are conveniently hinged to a bar, N, in the rear of the lathe, and can be made adjustable longitudinally upon such bar, so that they can be swung over upon the blank to cut the moldings at any desired point.

In operating this lathe a blank or piece, generally square in shape, is secured between the spindles and revolved. The head or carrier is then advanced by being thrown into engagement with the feed-screw, and the cutters D and E brought to operate upon the blank, the cutter D removing the surplus material and bringing the blank into such size and shape that it will pass through the ring F, where the cutter E, adjusted by the pattern-bar L, brings it down to the general shape desired. During this operation the ring F materially aids the action of the cutters by tightly clamping the blank near the point where they work, and largely prevents the springing and trembling, which is a great hinderance when a long blank is sustained only by the spindles.

As soon as the blank—or any part of it upon which it is desired to form a molding—has received its general shape by the action of the cutter E, the molding-cutter can be brought down upon it and the molding formed at the same time the cutters D and E are working upon the advanced part of the blank, and thus the benefit of the clamping-ring is made available to the molding-cutters as well as to the cutters D and E.

In working this lathe we found that, as the blanks were generally square, the cutter D was obliged to remove a large quantity of waste to bring them into a size and shape to pass through the ring F, and also that the cutter E was often required to make deep and long cuts to bring the blanks, after they have passed the ring, to the desired shape. The heavy work laid upon the cutters in this way called for the expenditure of too much driving-power, and also had the effect, in a short time, to dull the cutters, requiring frequent stoppages of the machine for the purpose of sharpening or exchanging them.

It is one of the main objects of the present invention to remedy the above-named defect in the lathe described in our Patent No. 218,863 by providing means for removing the surplus or waste with far less power than by the use of the cutters alone, and by thus relieving the cutters D and E of their heavy work they can be used for a long time without sharpening.

The means or devices which we have invented for accomplishing this object are described as follows, reference being made to the accompanying drawings, in which—

D' and E' are revolving circular saws, arranged to move to and fro between the head and tail stocks along the line of the blank, and while moving forward toward the head-stock to operate to cut away the surface of the blank. These saws are conveniently journaled in frames or supports attached to the head or carrier C, and of course move with such head, their line of movement being substantially parallel with the line of the spindles of the lathe. The arbors or shafts of these saws, instead of being parallel to the line of the spindles, are preferably slightly inclined to such line, so as to give the saws somewhat of a drawing cut instead of directly across the grain of the blank. These saws are driven by pulleys attached to their arbors or spindles, (designated in the drawings by $a'$ and $a^2$,) and are conveniently connected by bands with a revolving drum overhead, which extends along the lathe parallel with the line of the spindles, the bands being fed along the drum as the saws are moved forward and backward, and being prevented from slipping from their pulleys by pieces projecting up from the saw-frames or the head and bearing against the bands about midway between the drum and the pulleys, or by other convenient means. The saw-frames may be made adjustable by means of set-screws or otherwise, so that they can be moved to or from the line of the spindles to cut the blank to varying sizes. The saw D' is located so as to operate upon the blank directly in advance of the cutter D, and the saw E' directly in advance of the cutter E, although it is not intended to limit their use to a combination with these or any other cutters, as a single saw arranged and operating in this way may be used to advantage.

L' is a guide or pattern bar, having its edge fronting the blank of the reverse shape to which it is desired to bring the blank by the use of the saw E', which has an automatic adjustment, by which it is made to conform to the configurations of the guide or pattern bar. The devices by which this adjustment is made are shown in Fig. 4, and consist of a spring, $c'$, located in the rear of the saw-frame, and a projecting arm, $d'$, which extends from the saw-frame to and rests against the edge of the pattern-bar L'. This spring is of such power as to keep the end of the arm $d'$ in contact with the edge of the pattern-bar, and the saw E' is moved to and from the line of the spindles by the alternate expansion and compression of this spring, as permitted or caused by the configuration of the pattern-bar. The saw-frame may conveniently move on ways especially provided for this purpose. Instead of the spring $c'$, a weight attached to the frame by a cord passed over a pulley may be used, or any other construction which will cause the saw to follow the line of the pattern-bar. The saws are arranged to revolve in the same direction as the blank, and consequently operate with an effect equal to the aggregate momentum of the two—the saw and the blank. By properly adjusting or setting the saws a square or other shaped blank can be cut down to any desired diameter, as they can be run with sufficient velocity to made a deep cut and at the same time permit the head or carrier to move over the blank quite rapidly, so that the only work required of the cutters D and E, if used, is to smooth and finish the blank after the saws have done all the heavy work.

It is observed that both the saws D' and E' are arranged to operate upon the blank near the clamping-ring F, attached to the head or carrier C, so that they utilize this clamping device to prevent the spring and tremble of the blank. Unless the ring F or some equivalent clamping device is provided to hold the blank near the point where the saws operate, the work would, under the lateral pressure of the saws, be forced out of its true line and be unevenly operated on, and this would be especially the case in the center of long blanks which are to be brought down to a small diameter.

If in any case it shall be found that a single saw does not cut to the required depth with sufficient rapidity, a second, third, or any desired number can be arranged upon the same arbor or spindle and driven by the same pulley, the saws increasing in diameter from the advanced one of the series, and in this way the required depth and rapidity of cut can readily be obtained without too great speed of revolution.

Instead of revolving saws—that is, circular plates provided with saw-teeth—cutters of other kinds adapted to remove the surface of a blank and arranged upon the peripheries of revolving wheels, can be used in substantially the same way to effect substantially the same results.

It is not intended to limit the use of revolving saws or revolving cutters arranged to move automatically along the line of the blank and to operate upon it while thus moving to lathes of the kind set forth and shown herein, as it is considered that the present invention is of much wider application and use.

Another improvement on the construction shown and described in Patent No. 218,863 is a cutting-spur used in connection with the molding-cutters, and shown in Figs. 5 and 7 of the drawings, and designated by the letter R. This spur is preferably attached to the edge of the gage n, although it may be attached to the edge of the cutter m; but whether attached to the cutter or the gage its cutting point or edge should project a trifle lower than the edge of the cutter m. The object of this spur is to make a smooth vertical cut upon the edge of the molding, and this it does by separating the fibers of the wood before the cutter m reaches that depth and leaves the cut smooth and vertical. The spur is provided with a long slot and is secured to the side of the cutter or gage by a screw, and by this means it can easily be moved forward as its cutting-point is worn off.

The advantage of attaching the spur R to the side of the gage n rather than to the cutter is that in such case it gives a drawing cut, which can have no effect to tear or sliver up the fibers of the wood and leave the work rough.

R' is a gage or stop secured to the under side of the cutter-holder M, to limit the depth of the cut to be made by the cutter m. The surface of the holder on each side of the cutter may generally be used to govern the depth of the cut for the moldings; but if the piece or blank has been cut away on one or both sides, leaving simply a projection, which is to be formed into the desired molding or other ornamental form by the molding-cutter, in such case the under surface of the holder would not form the necessary stop or gage without the addition of gages like R' or some substitute therefor. When required, these may be applied on both sides of the cutters m.

What is claimed as new is—

1. In a turning-lathe or similar structure constructed and operating to revolve a blank, a revolving saw arranged to move along the line of the blank and operating to cut it away, in combination with a device attached to the head or carrier to clamp the blank while the saw is operating upon it, substantially as described.

2. In a turning-lathe or similar structure constructed and operating to revolve a blank, a revolving saw and a clamping device, both arranged to move along the line of the blank, in combination with mechanism, substantially as described, by which the saw is adjusted relatively to a pattern bar or guide, to cut the blank to varying depths, substantially as described.

3. A revolving saw in combination with a trimming-cutter and a clamping device, when all are attached to a head or carrier, and when such saw and cutter move with and in advance of such head or carrier between the spindles of a lathe, substantially as and for the purpose described.

4. A revolving saw in combination with a shaping-cutter and a clamping device, when all are attached to a head or carrier, and when such saw and cutter move with and in the rear of such head or carrier between the spindles of a lathe, substantially as and for the purpose described.

JAMES DAVIES.
FOSTER B. CHIDESTER.

Witnesses:
GEORGE HOLMES,
GEORGE BOETTCHER.